United States Patent [19]

Stewart et al.

[11] Patent Number: 4,858,173

[45] Date of Patent: Aug. 15, 1989

[54] APPARATUS AND METHOD FOR RESPONDING TO AN ABORTED SIGNAL EXCHANGE BETWEEN SUBSYSTEMS IN A DATA PROCESSING SYSTEM

[75] Inventors: Robert E. Stewart, Stow; Paul J. Natusch, Westford; Eugene L. Yu, Groton; James B. Keller, Arlington, all of Mass.

[73] Assignee: Digital Equipment Corporation, Maynard, Mass.

[21] Appl. No.: 823,775

[22] Filed: Jan. 29, 1986

[51] Int. Cl.⁴ .................... G06F 13/18; G06F 15/16
[52] U.S. Cl. ................................................. 364/900
[58] Field of Search ... 364/200 MS File, 900 MS File; 340/825.5

[56] References Cited

U.S. PATENT DOCUMENTS

| | | | |
|---|---|---|---|
| 3,543,242 | 11/1970 | Adams | 364/200 |
| 3,665,404 | 5/1972 | Werner | 364/200 |
| 3,676,860 | 7/1972 | Collier et al. | 364/200 |
| 3,710,324 | 1/1973 | Cohen et al. | 364/200 |
| 3,993,991 | 11/1976 | Cassarino et al. | 364/200 |
| 4,016,539 | 4/1977 | Nanya | 340/825.5 |
| 4,030,075 | 6/1977 | Barlow | 364/200 |
| 4,096,571 | 6/1978 | Vander Mey | 364/200 |
| 4,130,864 | 12/1978 | Schlotterer | 364/200 |
| 4,148,011 | 4/1979 | McLagan et al. | 364/900 |
| 4,232,294 | 11/1980 | Burke et al. | 364/200 |
| 4,232,366 | 11/1980 | Levy et al. | 364/200 |
| 4,275,458 | 6/1981 | Khera | 364/900 |
| 4,281,380 | 7/1981 | DeMesa, III et al. | 364/200 |
| 4,326,250 | 4/1982 | McCullough | 364/200 |
| 4,390,944 | 6/1983 | Quackenbush | 364/200 |
| 4,395,710 | 7/1983 | Einolf, Jr. et al. | 340/825.5 |
| 4,400,771 | 8/1983 | Suzuki et al. | 364/200 |
| 4,414,624 | 11/1983 | Summer, Jr. et al. | 364/200 |
| 4,417,302 | 11/1983 | Chimienti | 364/200 |
| 4,420,806 | 12/1983 | Johnson, Jr. et al. | 364/200 |
| 4,456,956 | 6/1984 | El-Gohary et al. | 364/200 |
| 4,493,036 | 1/1985 | Boudreau et al. | 364/200 |
| 4,513,390 | 4/1985 | Walter et al. | 364/900 |
| 4,514,728 | 4/1985 | Ahuja | 340/825.5 |
| 4,514,843 | 4/1985 | Albanese | 370/93 |
| 4,546,450 | 10/1985 | Kanuma | 364/900 |
| 4,562,535 | 12/1985 | Vincent et al. | 364/200 |
| 4,597,054 | 6/1986 | Lockwood et al. | 364/900 |
| 4,622,550 | 11/1986 | O'Connor et al. | 340/825.5 |
| 4,667,191 | 5/1987 | Comroe et al. | 340/825.5 |
| 4,706,082 | 11/1987 | Miesterfield et al. | 340/825.5 |
| 4,706,150 | 11/1987 | Lebizay et al. | 340/825.5 |

FOREIGN PATENT DOCUMENTS

| | | |
|---|---|---|
| 84/02210 | 6/1985 | European Pat. Off. |
| 3407870 | 8/1985 | Fed. Rep. of Germany |
| 60-214066 | 10/1985 | Japan |
| 440 | 3/1986 | Japan |
| 2133 | 3/1986 | Japan |
| 2171542 | 8/1986 | United Kingdom |

Primary Examiner—Gary V. Harkcom
Assistant Examiner—Christopher H. Lynt
Attorney, Agent, or Firm—Finnegan, Henderson, Farabow, Garrett, & Dunner

[57] ABSTRACT

In a data processing system in which access to a second unit by a first unit through a system bus is determined by an arbitration unit, when a requesting unit that receives access to the system bus is unable to use that access for interaction with the second unit, a busy signal is provided to the arbitration unit and to the units. The busy signal causes the units to reinstitute a request for access to the system bus when the subsystem had an aborted transaction. The busy signal enforces a delay in the next arbitration for the system bus until a unit, with an aborted transaction as a result of the busy signal, can reassert the request for access signal. Moreover, apparatus can be included with the arbitration unit that permits rearbitrating access to the bus using the priority conditions in effect at the time of the original arbitration.

10 Claims, 6 Drawing Sheets

APPARATUS AND METHOD FOR RESPONDING TO AN ABORTED SIGNAL EXCHANGE BETWEEN SUBSYSTEMS IN A DATA PROCESSING SYSTEM

RELATED APPLICATIONS

This application is related to the following patent applications, all of which were filed in the U.S. Patent and Trademark Office on the filing date of the present patent application.

APPARATUS AND METHOD FOR PROVIDING DISTRIBUTED CONTROL IN A MAIN MEMORY UNIT OF A DATA PROCESSING SYSTEM; U.S. Patent Application Ser. No. 823,687; filed Jan. 29, 1986; by Paul J. Natusch; Eugene L. Yu; David C. Senerchia; and Beverly A. Henry as Administratrix of the Estate of John F. Henry, Jr., Deceased.

APPARATUS AND METHOD FOR ADDRESSING SEMICONDUCTOR ARRAYS IN A MAIN MEMORY UNITR ON CONSECUTIVE SYSTEM CLOCK CYCLES; U.S. Pat. No. 4,791,552, filed Jan. 29, 1986: by Paul J. Natusch; David C. Senerchia; and Beverly A. Henry as Administratrix of the Estate of John F. Henry, Jr., Deceased.

APPARATUS AND METHOD FOR INCREASED SYSTEM BUS UTILIZATION IN A DATA PROCESSING SYSTEM; U.S. Pat. No. 4,808,218; filed Jan. 29, 1986; by Paul J. Natusch; David C. Senerchia; and Beverly A. Henry as Administratrix of the Estate of John F. Henry, Jr., Deceased.

BACKGROUND OF THE INVENTION

1. Field of the Invention

This invention relates generally to data processing systems and more particularly to the exchange of logic signals between data processing subsystems on a system bus in the data processing system.

2. Description of the Art

Figure 1:
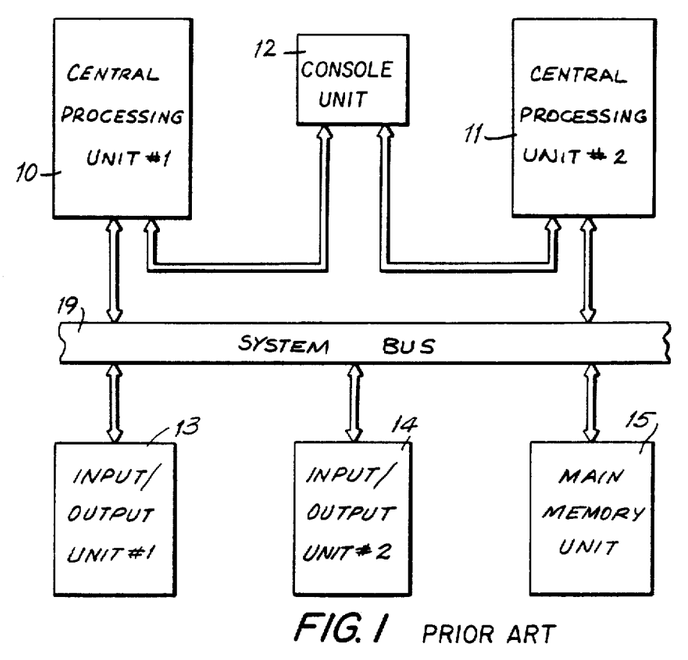
FIG. 1 is a block diagram of the components of a data processing system capable of utilizing the present invention.

Referring to FIG. 1, a typical data processing system is shown. The illustrated data processing system includes central processing units 10 and 11, input/output units 13 and 14, a main memory unit 15 and a system bus 19 coupling together the central processing, input/output and main memory units of the data processing system. The central processing unit 10 or 11 processes groups of logic signals according to software and/or firmware instructions. The logic signal groups to be processed as well as the current program in execution are typically stored in the main memory unit 15.

A console unit 12 can be coupled to the central processing units and includes apparatus and stored instructions to initialize the system. The consolel nit 12 can also act as a terminal during the operation of the data processing system. The input/output units 13 and 14 provide a user interface between the data processing system and components such as terminal units, mass storage units, comunication units, and any other units to be coupled to the data processing system.

However, a problem can arise when access to the system bus is awarded to a first unit and the appropriate activity for the implementation of the signal exchange is initiated, but the signal exchange does not result in successful processing by the receiving unit. Such a situation occurs when, for example, the main memory unit is busy and the signals applied thereto can not be processed by the main memory unit. The main memory unit can return a signal that indicates that the logic signals were or were not processed by the main memory unit through a Confirmation Acknowledge signal or a Confirmation Busy signal.

By the time that the first unit is able to retry the access to the main memory unit, the arbitration unit can have given access to other subsystems, and these other subsystems can have initiated memory activity which causes the first sub system to receive a memory busy signal again upon rearbitration by the first subsystem. Thus a situation occurs wherein a sub system of lower priority prevents a subsystem having a higher priority from gaining access to a data processing system resource, such as a main memory unit.

A possible solution to an inability of a subsystem to acquire access to a memory unit after bus access is granted in a first arbitration is to delay additional arbitration of the access to the system bus until after the exchange of the signals has taken place. In this solution, the next sequential arbitration is delayed a predetermined period to insure that the processing of the transferred signals has taken place or that unit which was awarded bus access in the first arbitration has been able to renew the request for access to the bus. This solution results in unacceptable delays in the exchange of signal groups between units.

A need has therefore been felt for apparatus and method for interaction between data processing units and a system bus such that access is granted to the system bus based on the priority of the unit requesting access while preventing inadvertent monopolization of the system bus by an inappropriate data processing system.

SUMMARY OF THE INVENTION

It is an object of the present invention to provide an improved data processing system.

It is a further object of the present invention to provide a data processing system that can provide for aborted exchanges of signals between data processing units without permitting; an inappropriate unit to access the system bus.

It is an object of the present invention to provide apparatus for identifying and communicating to a signal-issuing data processing unit that the signal-receiving unit is currently unable to process signals from the system bus.

It is a another particular object of the present invention, to provide a main memory unit with apparatus for generating a Memory Busy signal when the main memory unit is unable to process the signals applied to the system bus.

It is still another object of the present invention to provide apparatus associated with the main memory unit that, upon determination that the main memory unit can no longer process incoming data signal groups, applies a Memory Busy signal to the remaining units and to a unit controlling access to the system bus.

It is yet another particular object of the present invention to restore a priority state of a unit which determines access to a data processing system bus to a priority state of one before an aborted transfer of logic signals prior to rearbitration for access to the system bus.

These and other features of the present invention will be understood upon reading of the following description along with the drawings.

DETAILED DESCRIPTION OF THE PREFERRED EMBODIMEN

1. Detailed Description of the Figures

FIG. 1 has previously been described in relation to the related art.

Figure 2:
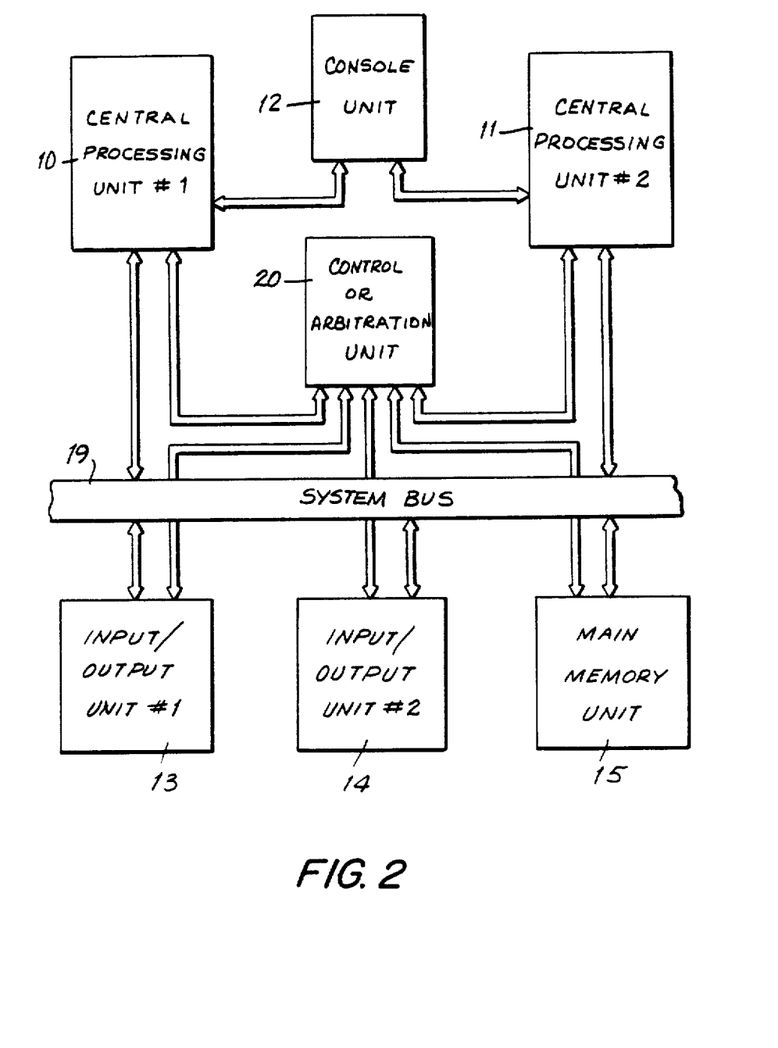
FIG. 2 is a block diagram of a data processing system having an arbitration unit controlling the successive determinations of access to the system bus for data processing units.

Referring next to FIG. 2, the data processing system and the data processing units, as shown and described with reference to FIG. 1, are illustrated. In addition, an arbitration unit 20 controls the application of groups of logic signals to a bus sytem. The arbitration unit 20 operates in the following manner. In order to gain access to system bus 19a, unit must place a group of logic signals on the system bus, and Request logic signal is applied to a mechanism coupling the data processing unit and the arbitration unit 20. In the simplest situation, the data processing subsystem and the arbitration unit 20 are coupled by lines. A logic signal is applied thereto to indicate the presence of a Request for access to the system bus, and the identity of the subsystem requesting the access. Communication between arbitration unit 20 and a data processing unit may be via the system bus or separate lines.

Based on an algorithm preventing monopolization of the system bus by a particular unit, assigning priority parameters to the various data processing units, and taking account of any other factor deemed important in the access to the sytem bus, the arbitration unit 20 determines the next data processing unit 10, 11, 13, or 14 to have access to the system bus and an Enable logic signal is applied to a selected unit by a coupling means, typically a conductor. The presence of this Enable logic signal communicates to the selected data processing unit that a logic signal group can be applied to the system bus.

The selected unit can apply a Hold logic signal to he arbitration unit 20. The Hold logic signal is used in those situations where the selected data processing unit must apply a plurality of logic signal groups to the system bus in adjacent cycles, for example a write operation as opposed to a read operatin. The Hold signal prevents the Enable signal from being removed from the selected data processing unit until the necessry system clock cycles have passed for the plurality of related logic signal groups to have been applied to system bus 19. In addition to the signals identified above, the unit to which the logic signals are transferred has apparatus to identify the receipt of the transferred signal groups and provides a confirmation signal. For example, a Confirmation Acknowledge signal or a Confirmation Busy signal are provided to the sending unit upon determination of a status of the signal group transfer.

Figure 3:
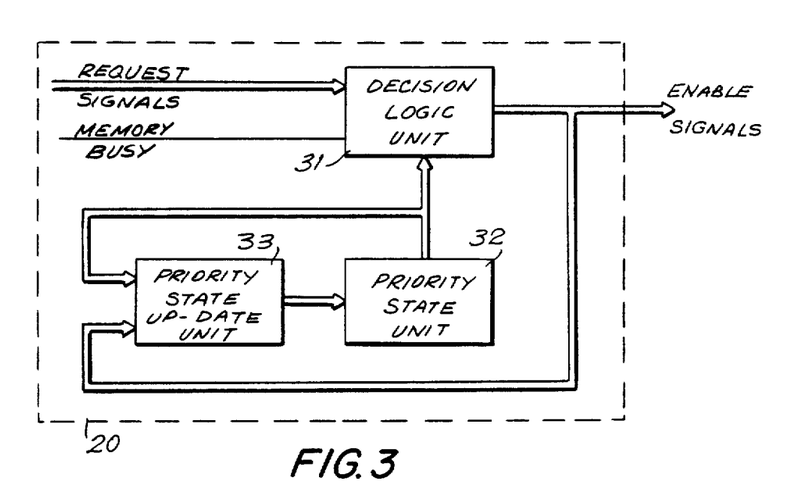
FIG. 3 is a block diagram of the components of an arbitration unit.

Referring next to FIG. 3, the components of the arbitration unit 20 are shown. At least one request signal is applied to the arbitration unit 20 indicating that access to the system bus 19 is required by the unit. These request signals are applied to decision logic unit 31. Also applied to decision logic unit 31 are signals from priority state unit 32. The signals from the priority state unit 32 control logic elements in the decision logic unit 31 such that, when a plurality of Request signals are applied to the decision logic unit 31, the Enable signal is selected based on preassigned priorities.

However, once the unit is selected, then priority assigned to hat unit will typically change. To provide for this change in priority, the Enable signals and the priority state signals are applied to up-date logic unit 33. Up-date logic unit 33 applies appropriate signals to the storage elements of priority state to be applied to decision logic unit 31.

Also shown in FIG. 3 is the application of a unit busy signal, i.e., the Memory Busy signal, to the decision network 31. According to one aspect of the invention, the unit busy signal can prevent unit "lock-out", described below, without the use of the priority up-date unit 33.

Figure 4:
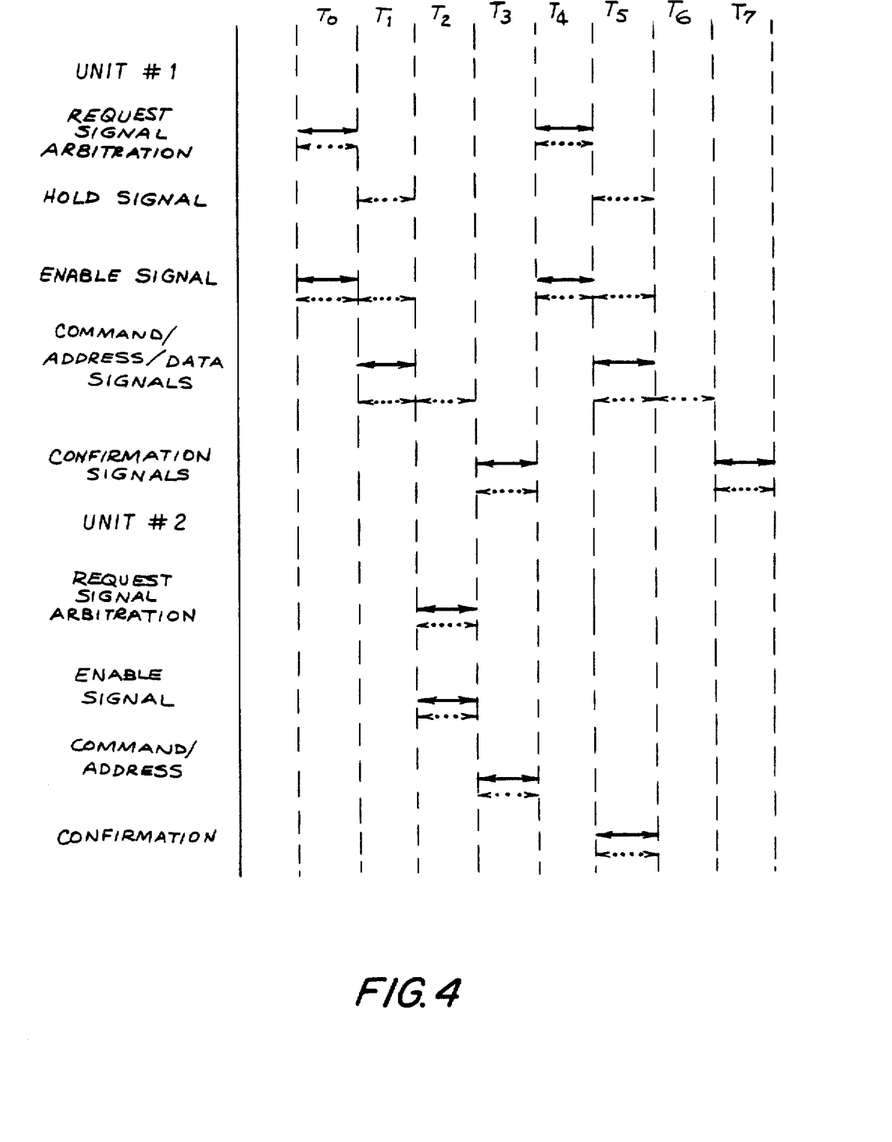
FIG. 4 is a timing diagram illustrating how a unit requesting access to the system bus can be unable to gain access the system bus after more than one access attempt.

Referring to FIG. 4, a timing diagram illustrating tthe operation of the interaction between units, competing for access to the system bus, is shown. Arbitration unit 20 is enabled to select the next unit to have access to the system bus during clock cycle $T_0$. The arbitration of the Request signals occurs during that system clock cycle. During the same system clock cycle thte result of that arbitration in the form of an Enable signal is transmitted to the selected unit. At the end of this arbitration cycle, the priority parameters are up-dated to reflelct the successful access to the system bus by the selected unit.

During the next timing cycle, $T_1$, the command/address information is applied to the system bus. (When the access to the system bus involves a Write comman, during cycle $T_1$ unit 1 asserts a Hold signal and the Command/Address signal, and the arbitration unit maintains the Enable signal. During the next cycle, $T_2$, the data signal group to be stored is applied to the system bus.)

During the second timing cycle after the command-/address cycle, i.e., during $T_3$, the unit to which the command was addressed responds with a Acknowledge Confirmattion signal indicating successful transfer of the signal groups. If that unit sends the Busy Confirmation signal instead, the transfer of signal groups has been aborted. Then the unit can not attempt to gain access to the system bus again until during cycle $T_4$ to execute the original operation.

However, a second unit (c.f. FIG. 4) can, in the intervening interval, have gained access during period $T_2$ to the system bus. The result of this access can have been successful resulting in a Confirmation Acknowledge signal in period $T_5$. As a result of that activity, the first unit can receive a Confirmation Busy signal in period $T_7$. In this manner, the confirmation signal is delayed to the extent that unit #1 requesting access to the system bus did not receive knowledge of the aborted signal transfer until after a subsequent arbitration. And when unit #1 made a second attempt to gain access to the system bus in T₄, the memory unit was again busy because of the memory activity started by #2 in T₂.

Figure 5:
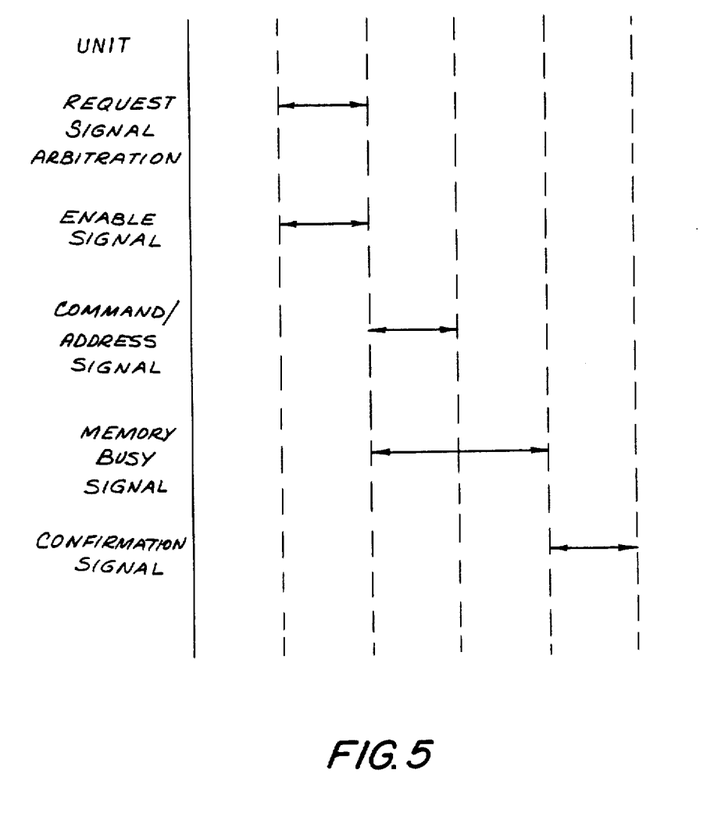
FIG. 5 is a timing diagram showing the signals on the system bus according to the present invention which eliminates the potential inability of a data processing unit to access the system bus.

Referring next to FIG. 5, a timing diagram of the technique of the present invention for avoiding the inability of a data processing unit to gain access to the memory unit by means of the system bus is illustrated. Typically, the problem in granting access to the requesting unit is that the main memory unit 15 the unit to which signal groups are being sent is busy during an attempted access. As illustrated in FIG. 4, the busy confirmation signal, indicating that the processing of signals transferred to the main memory unit 15 was not successful, is not communicated to arbitration unit 20 and to the requesting unit sufficiently early for that unit to respond in an appropriate manner.

According to the present invention, when a memory activity results in a condition indicating that the processing of further signal is temporarily not possible, then a Memory Busy signal is transferred to all units, including the arbitration unit 20. According to the preferred embodiment of the present invention, an interaction with the memory will not be aborted unless the Memory Busy signal occurs during thte Command/Address cycle or during the first data signal group cycle. When the Memory Busy signal occurs in either of these interaction cycles, then the issuing unit determines that the transaction was aborted, and as a result, the issuing unit (with the aborted transactions) rerequests access to the system bus. However, the Memory Busy signal applied to decision logic 31 prevents arbitration for access to he system bus until the Memory Busy signal is removed. Such time period is long enough for the issuing unit (with the aborted transaction) to reapply the request signal (typically in two clock cycles.)

Figure 6:
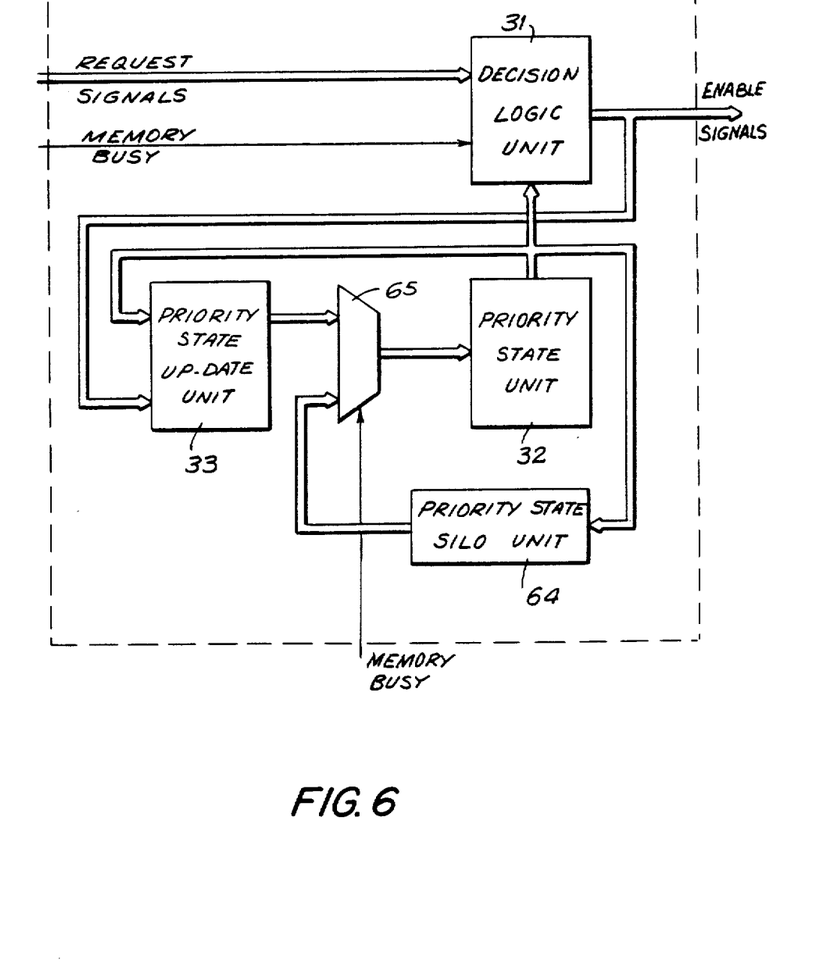
FIG. 6 is a block diagram of the arbitration unit including the apparatus implementing one aspect of the present invention.

Referring next to FIG. 6, the arbitration unit 20, according to another aspect of the present invention, is illustrated. The decision logic unit 31 receives Request signals from the units when the units require access to the system bus, in the specific example, for exchange of logic signals with the memory unit 15. As a result of the Request signals, an Enable signal is generated by logic gates in the decision logic unit 31. The operation of the logic gates of unit 31 is determined by signals from the priority state logic 32. The priority state logic signals are determined by storage elements in the priority state unit 32 in accordance with the current priorities assigned to the units of the data processing system. As before, the priority up-date logic unit 33 received signals from the priority state unit 32 indicating the current state of the priority assignments and receives the Enable signals. Based on a predetermined algorithmn, a new current priority assignment is produced and can be applied to the priority state unit 32 through controllable switch 65.

A priority state silo 64 also received the current priority state silo 64. Priority state silo 64 stores the priority parameters or state upon which the arbitration decision for the aborted transfer was made. This priority state can also be applied to the priority state logic unit 32 through the controllable switch 65. The signals actually applied to the priority state unit 32 through switch 65 are determined by the Memory Busy signal, such that, upon application of the Memory Busy signal, switch 65 selects signals from priority state silo unit 64. (When the Memory Busy signal is not applied, the next state is determined by the priority up-date unit 33.) After a Memory Busy signal (which indicates that the logic signal transfer has been aborted) is generated by the memory unit, then the unit which received access to the system bus, and was unsuccessful in the transfer of data on the system bus, can participate in rearbitration of bus access subject to the same priorities that existed at the time of the original bus arbitration.

2. Operation of the Prefered Embodiment

In data processing systems of the related art, the lack of ability of the data processing units to respond to an aborted transaction resultd from the use of a confirmation signal that was issued after the determination was made as to the next unit to gain access to the bus. The Memory Busy signal prevents inadvertent lock-out of a subsystem by performing two functions simultaneously. First, the arbitration unit is prevented from providing access to the system bus for the duration of the Memory Busy cycle, and second, the Memory Busy signal is asserted for sufficient time to permit the units having transactions aborted by the Memory Busy signal to reinstitute a request for access to the system bus. With respect to the units, the above-described relationship of the assertion of the Memory Busy signal and the signals being applied to the system bus determine when a transaction has been aborted. Therefore, a unit with an aborted request can reapply the Request signal to the arbitration unit 20. The enforced during of the Memory Busy cycle insures that the unit will have an opportunit to be included in the next arbitration procedure.

As shown in FIGS. 3 and 6, arbitration units 20 have apparatus to up-date the priority states of the units. The algorithm embedded in the arbitration unit 20 of FIG. 3 operates under the assumption that the data processing unit having current access to the system bus has been successful in executing the command signal transfer and in performing the function defined by the command signals resulting from the previous arbitration prodcess. The algorithm does not address the possibility that the access to the system bus might not result in effectuating the function required by the unit which was awarded access to the system bus. Indeed, the timing of the arbtration procedure is such that the arbitration unit issues the Enable signal (the signal indicating to a unit that the arbitration process has granted the subsystem access to the bus) before the arbitration unit detects the Confirmation Busy signal. The conditions establishing the status of the Confirmation signal can not be determined at an earlier time.

The second embodiment of the present invention, shown in FIG. 6, takes into account the late receipt of Memory Busy signals by providing a priority state silo unit 64, for reestablishing the last previus priority state of the system in response to assertion of the Memory Busy signal.

Referring again to FIG. 6, priority state silo unit 64 stores the priority state of the system at the point when the unsuccessful transactions was arbitrated. In response to assertion of the Memory Busy signal, the contents of the silo unit 64 are reintroduced into priority state unit 32, thus restoring priority state unit 32 to its condition immediately prior to the unsuccessful transaction. Thus, in the event that the unit whose transaction likely was aborted requests access to the system bus, the priority state will be essentially the same as at the time of the arbitration which resulted in an unsuccessful transaction. Thus, when the Memory Busy signal is de-asserted, the rerequesting unit has a higher priority in receiving access to the bus than the other units that were requesting bus access during of the rerequsting unit's earlier arbitration.

It will be clear that the rearbitration of access to the system bus using the previous priority state does not ensure that the previously successful unit will receive access to the system bus on rearbitration. A new Request signal from a unit having a higher priority can have been applied to the arbitration unit 20 between the first and the second bus arbitration cycles.

It will also be clear that the technique of rearbitration of requests for access to the system bus has been described with particularity in relation to the main memory unit. The technique of rearbitration in the event of an aborted access to any unit of the data processing system can utilize this technique when aborted accesses have performance penalties significant enough to permit the use of the additional apparatus.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A method of providing for interaction between data processing units in a data processing system comprising the steps of:
    applying prestored state signals to a decision portion of an arbitration unit, by a priority state storage device, said state signals determined by priorities assigned to each of said data processing units;
    applying request signals to said arbitration unit by data processing units requiring access to other data processing units;
    selecting, by said decision portion of said arbitration unit, a selected data processing unit to receive access to another data processing unit based on said priorities and said applied request signals;
    changing said state signals based on new priorities determined by said step of selecting a data processing unit, when access by said selected unit to another data processing unit is successful; and
    repeating said selecting step when said access by said selected unit is not successful based on said priorities as existing before an unsuccessful access.

2. Apparatus for ensuring access to a system bus in a data processing system comprising:
    a plurality of units associated with said data processing system, each of said units including:
        request signal means for generating a request signal when access to said system bus is required, and busy signal means for providing a busy signal when a unit is busy, whereins aid request signal means includes apparatus responsive to said busy signals from other of said units and to selected internal conditions for generating said request signal; and
    arbitration means responsive to said request signals for generating a bus grant signal to a selected unit granted access to said system bus, said arbitration means further including means responsive to a corresponding one of said busy signals for preventing generation of said bus grant signal for a period of time at least equal to the period of time for said selected unit to generate said request signal.

3. In a data processing system having a system bus for transfering logic signal groups between a plurality of data processing units and a memory unit, apparatus for controlling access to said system bus by said data processing units comprising:
    an arbitration unit for selecting a data processing unit to gain access to said system bus in response to request signals from said data processing units, said request signals being generated by respective ones of said data processing units requiring access to said system bus; and
    signal means associated with said memory unit, said signal means applying a busy signal to said arbitration unit when said memory unit can accept no additional logic signal groups, said busy signal preventing said arbitration unit from selecting a data processing unit, said arbitration unit selecting a data processing unit to gain access to said system bus in response to at least one of said request signals from said respective ones of said data processing units after said busy signal is not applied for a period of time at least equal to the time for said selected data processing unit to generate a new request signal.

4. The apparatus of claim 3 wherein generation of said busy signal aborts access to said system bus by a currently selected data processing unit.

5. The apparatus of claim 4 wherein said arbitration unit includes a storage unit, said storage unit storing arbitration priority states, said storage unit applying said priority states present immediatey prior to a gaining of access to said system bus by said currently selected unit when said busy signal is removed.

6. A method of allocating access to a system bus to ones of a plurality of data processing units, said ones of said plurality of data processing units allocated access to said system bus utilizing said system bus to transfer logic signal groups between other ones of said plurality of data processing units, said method comprising the steps of:
    requesting access to a system bus by said ones of said plurality of data processing units;
    granting access to said system bus, by an arbitration unit, to a selected one of said data processing units requesting access to said system bus;
    transferring logic signal groups, by said system bus, from said selected data processing unit to a target data processing unit;
    transmitting a busy signal for a first period of time from said target data processing unit to said plurality of data processing units and to said arbitration unit when said logic signal groups are transferred, said first period of time having a sufficient duration to allow said selected data processing unit to repeat said step of requesting access to said system bus; and
    inhibiting successive steps of granting access to said system bus during said first period of time in response to said busy signal.

7. A method according to claim 6 wherein said step of granting access to said system bus is conditioned upon relative priorities assigned to said one of said plurality of data processing units.

8. A method according to claim 7 wherein said step of granting access further includes the substep of storing the relative priorities of said data processing units.

9. A method according to claim 8 further including tthe step of regranting access to said system bus by said arbitration unit utilizing said stored relative priorities in response to said busy signal.

10. A method according to claim 6 wherein said step of transferring logic signal groups to a target data processing unit includes designating a main memory unit as the target data processing unit.

UNITED STATES PATENT OFFICE
CERTIFICATE OF CORRECTION

PATENT NO. : 4,858,173
DATED : August 15, 1989
INVENTOR(S) : Robert E. Stewart et al It is certified that error appears in the above-identified patent and that said Letters Patent is hereby corrected as shown below:

Claim 2, column 7, line 53, change "whereins aid" to --wherein said--.

Claim 9, column 8, line 61, change "tthe" to --the--.

Signed and Sealed this

Second Day of October, 1990

Attest:

HARRY F. MANBECK, JR.

*Attesting Officer*  *Commissioner of Patents and Trademarks*